United States Patent
Home

(10) Patent No.: US 11,172,780 B2
(45) Date of Patent: Nov. 16, 2021

(54) COMPOUND ECO-FRIENDLY STOVE

(71) Applicant: LOVINFLAME, INC., Taipei (TW)

(72) Inventor: William Home, Taipei (TW)

(73) Assignee: LOVINFLAME, INC., Taipei (TW)

( * ) Notice: Subject to any disclaimer, the term of this patent is extended or adjusted under 35 U.S.C. 154(b) by 356 days.

(21) Appl. No.: 16/404,743

(22) Filed: May 7, 2019

(65) Prior Publication Data
US 2020/0352385 A1    Nov. 12, 2020

(51) Int. Cl.
*A47J 27/12*      (2006.01)
*A47J 37/01*      (2006.01)
*A47J 27/00*      (2006.01)
*A47J 37/06*      (2006.01)

(52) U.S. Cl.
CPC ............. *A47J 27/12* (2013.01); *A47J 27/002* (2013.01); *A47J 37/01* (2013.01); *A47J 37/06* (2013.01)

(58) Field of Classification Search
CPC .......... A47J 27/12; A47J 37/01; A47J 27/002; A47J 37/06; A47J 37/0635; A47J 37/0786; A47J 37/0676; A47J 37/0623; A47J 37/067; A47J 37/0704; A47J 37/0713; A47J 37/0647; A47J 37/0658; A47J 2037/0795
USPC ......... 99/325, 339, 340, 372, 444, 446, 450, 99/482; 126/20, 21 R, 25 R, 41 R, 9 R
See application file for complete search history.

(56) References Cited

U.S. PATENT DOCUMENTS

| | | | |
|---|---|---|---|
| 2011/0262113 A1* | 10/2011 | Home | A47J 37/0635 |
| | | | 392/307 |
| 2015/0164275 A1* | 6/2015 | Molnar | A23L 3/0055 |
| | | | 426/523 |

* cited by examiner

*Primary Examiner* — Phuong T Nguyen
(74) *Attorney, Agent, or Firm* — Leong C. Lei

(57) ABSTRACT

A compound eco-friendly stove includes a main body, a baking tray support, a baking tray, a butterfly style burner assembly, a grill grate, a grease guide plate, a grease pan, and a lift handle. The main body is provided, on a top, with a first cover and a second cover, which define therebetween an airflow passage. The baking tray support supports the baking tray thereon and is formed with multiple through holes at two sides of the baking tray. The butterfly style burner assembly, the grill grate, the grease guide plate, and the grease pan are disposed sequentially under the baking tray support. An upper compartment oven is formed between the baking tray support and the first and second covers and a lower compartment grill is formed between the butterfly style burner assembly and the grill grate.

8 Claims, 5 Drawing Sheets

COMPOUND ECO-FRIENDLY STOVE

(a) TECHNICAL FIELD OF THE INVENTION

The present invention relates generally to a compound eco-friendly stove, and more particularly to a multifunction stove using a single butterfly style burner assembly to realize both baking and grilling at the same time, wherein a space above the butterfly style burner assembly functions as an oven for baking food and a space below the butterfly style burner assembly serves as a smoke-free grill so as to achieve the purposes of being multifunctional, doubled performance, and environmental protection.

(b) DESCRIPTION OF THE PRIOR ART

Ovens have been widely used in daily living for preparing food. They are almost a must of daily living.

Traditional pizza ovens are structured to provide direct heating to a burner assembly or radiation, heating is employed. Such baking structure has at least the following drawbacks:

(1) The traditional pizza oven is structured with one single purpose of baking. Consumers who wish to grill food must purchase a separate grill. This is an economic burden.

(2) The traditional pizza oven is not structured to make use of residual heat generated thereby and this causes a waste of energy.

(3) A gas-fired or coal-fired oven only generates heating that is applied to a surface of food only and is incapable of omnidirectional uniform heating of the entirety of a pizza.

(4) Known gas-fired grills may generate waste gas that has a temperature of 200-500° C., which would apparently cause worsening of the greenhouse effect and is disadvantageous to protection of the environment.

In view of the above, the present invention aims to provide a solution that helps overcome the above drawbacks.

SUMMARY OF THE INVENTION

An objective of the present invention is to provide a compound eco-friendly stove, which includes a single butterfly style burner assembly that achieves both baking and smoke-free grilling, wherein a space above the butterfly style burner assembly serves as an oven, while a space below the butterfly style burner assembly serves as a smoke-free grill, so that the purposes of multiple functions, doubled performance, and environmental protection can be achieved.

To achieve the above purpose, the present invention comprises a main body, a baking tray support, a baking tray, a butterfly style burner assembly, a grill grate, a grease guide plate, a grease pan, and a lift handle, wherein the main body has a top opening that is provided with a first cover and a second cover, such that the first cover and the second cover define therebetween an airflow passage; the baking tray support is arranged in the top opening of the main body and the baking tray support receives and supports the baking tray thereon, portions of the baking tray support on two sides of the baking tray being formed with multiple through holes; the butterfly style burner assembly is disposed in the main body at a location below the baking tray support; the grill grate is disposed in the main body at a location below the butterfly style burner assembly; the grease guide plate is disposed in the main body at a location below the grill grate; the grease pan is disposed t a location below the grease guide plate; and the lift handle is mounted to the second cover.

The efficacies that the present invention may provide are as follows:

(1) Multiple functions, including an oven and a grill, can be provided with just on single butterfly style burner assembly.

(2) The space above the butterfly style burner assembly serves as an oven, while the space below the butterfly style burner assembly serves as a grill, and doubled performance can be achieved.

(3) In baking food, such as Pizza, biscuits, and cakes, with radiation heating from the butterfly style burner assembly, heated airflow ascends through distributed holes and is guided by an airflow passage to uniformly circulate so that both sides of the food can be sufficiently heated.

(4) The butterfly style burner assembly is provided above the grill grate so that grease and oil of food are prevented from dropping onto the butterfly style burner assembly to generate oily smoke.

(5) When the oven and the grill that are respectively located above and below the butterfly style burner assembly are put into operation simultaneously, thermal performance of pizza stones may reach 450° C., while the temperature of the grill grate may reach 350° C., so as to achieve full use of the thermal energy, wherein the thermal energy utilization efficiency can be of doubled performance as compared with known grills, and the temperature of waste gas discharged therefrom is also reduced to thereby help slow down the speed of global temperature rise.

(6) An upper compartment arranged above the butterfly style burner assembly is used as an oven above to help reduce the temperature of the waste gas discharged therefrom, so that the present invention allows for reducing the amount of enclosure material used so as to help protect the environment.

Example embodiments are described below, with reference to the attached drawings, in order to provide a better understanding of functionality and feature of this invention.

DETAILED DESCRIPTION OF THE PREFERRED EMBODIMENTS

Figure 1:
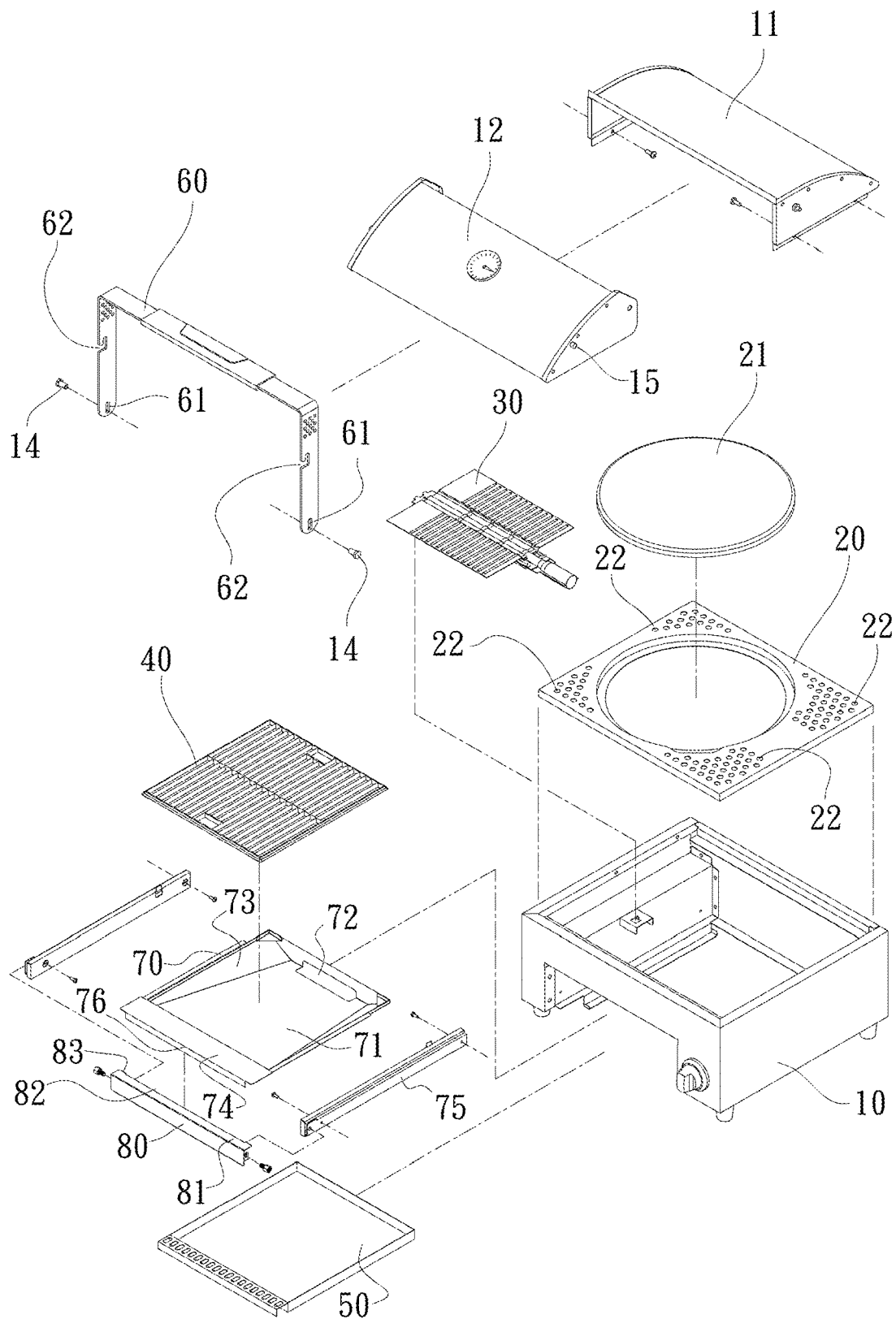
FIG. 1 is an exploded view of the present invention.
Figure 2:
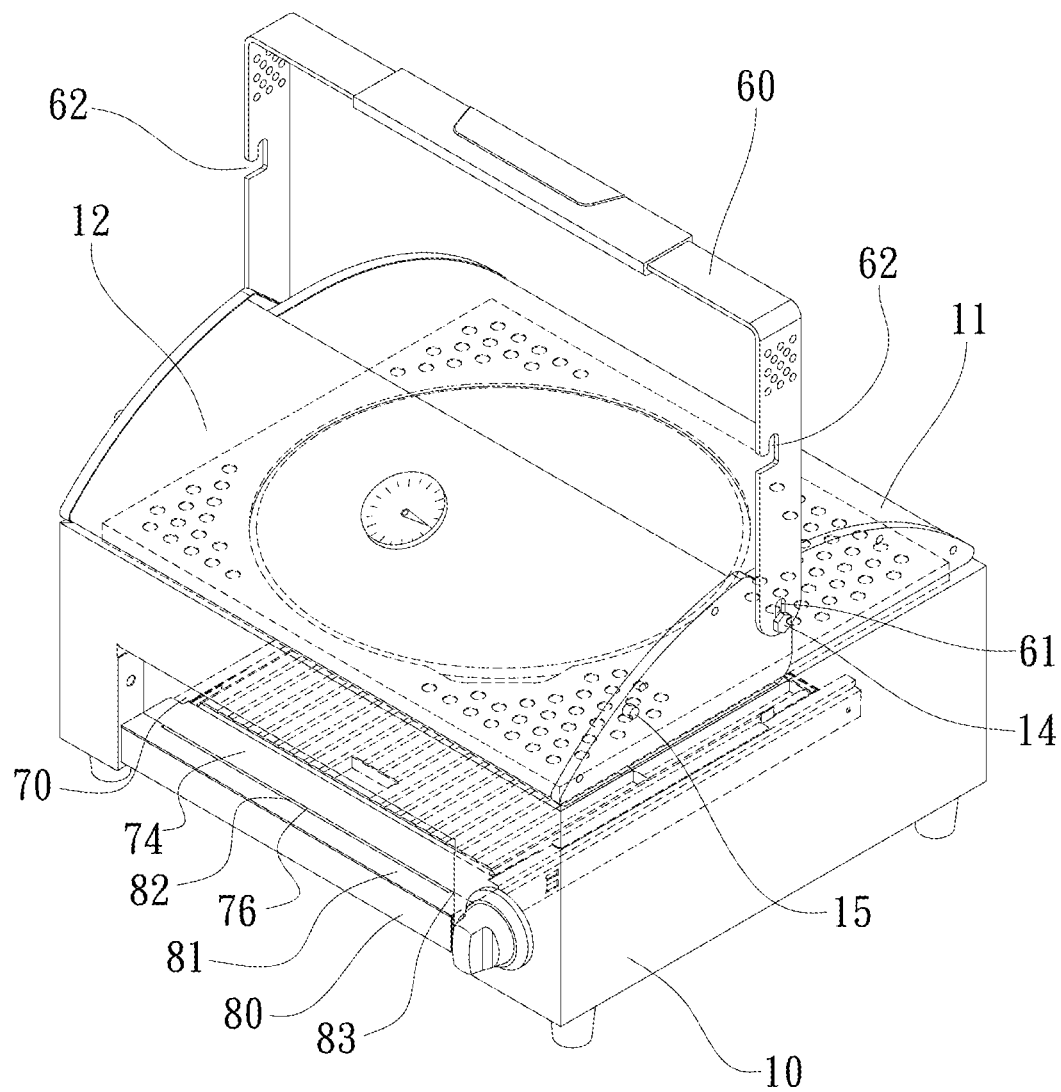
FIG. 2 is a perspective view of the present invention.
Figure 3:
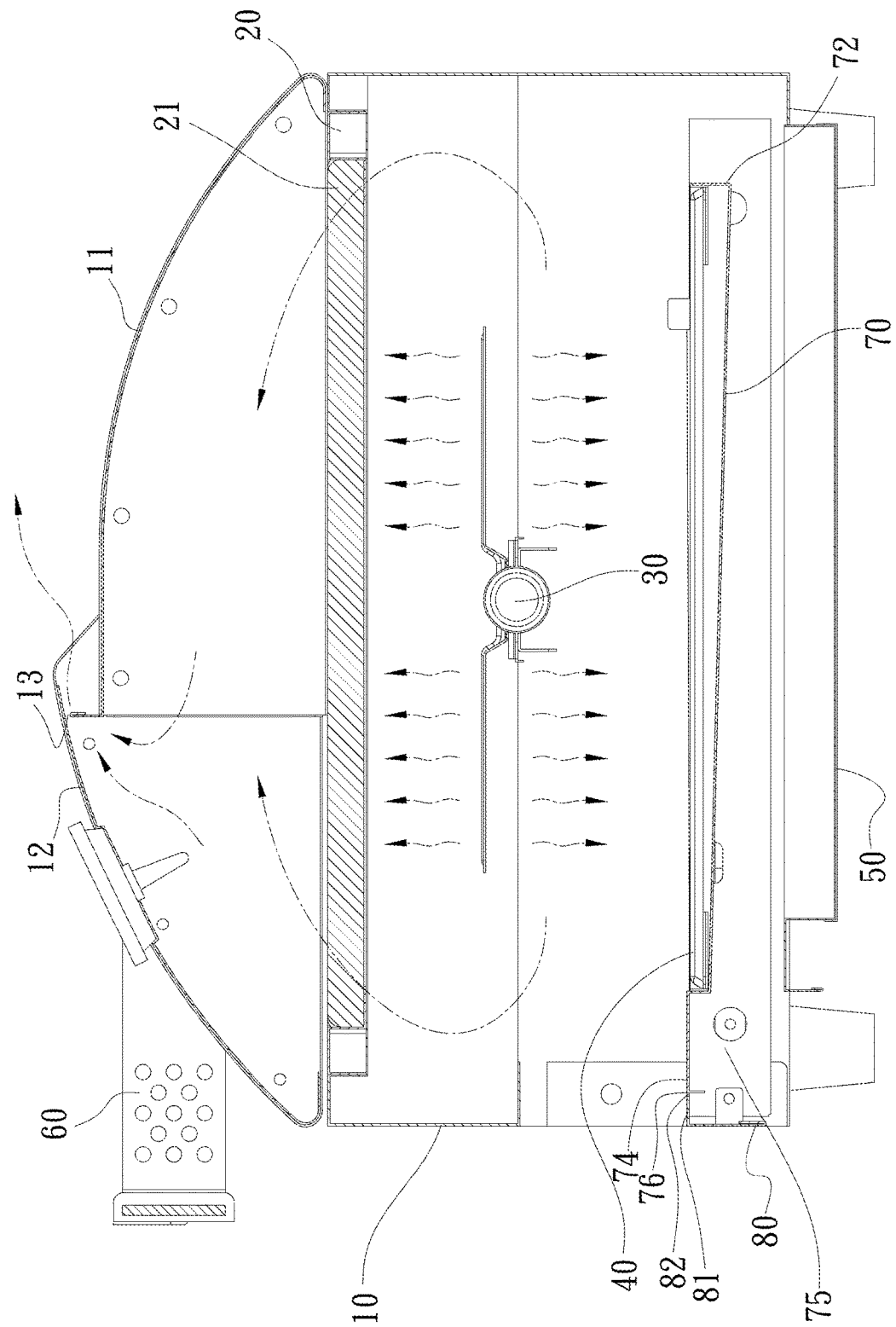
FIG. 3 is a cross-sectional view showing an example of operation of the present invention.

Referring to FIGS. 1-3, the present invention comprises a main body 10, a baking tray support 20, a baking tray 21, a butterfly style burner assembly 30, a grill grate 40, a grease guide plate 70, a grease pan 50, and a lift handle 60, details of which are provided below:

The main body 10 has atop side that defines a top opening and is provided with a first cover 11 and a second cover 12. The first cover 11 and the second cover 12 are arranged to form an airflow passage 13 therebetween.

The baking tray support 20 is arranged in the top opening of the main body 10. The baking tray support 20 is structured to receive and support a baking tray 21 positioned thereon. The baking tray support 20 has portions that are located on sides, particularly two opposite sides, of the baking tray 21 and multiple through holes 22 are formed in such portions.

The butterfly style burner assembly 30, which generally comprises a central tube with flames set at two opposite sides of the tube and projecting horizontally from the two opposite sides, while shielded by blocking plates at two opposite sides of the tube and located above the flames, is disposed in the main body 10 at a location below the baking tray support 20.

The grill grate 40 is disposed in the main body 10 at a location below the butterfly style burner assembly 30.

The grease pan 50 is disposed in the main body 10 at a location below the grill grate 40.

The grease guide plate 70 is disposed in the main body 10 at a location below the butterfly style burner assembly 30.

The lift handle 60 is mounted to the second cover 12.

The above provides a description of the components that make up this invention and assembly thereof. The following will provide a description of an embodiment of the structural arrangement of the present invention and also examples of assembly and use, as well as features and advantages thereof.

A space above the butterfly style burner assembly 30 may function as an oven for baking food and a space below the butterfly style burner assembly 30 may serve as a smoke-free grill so as to achieve the purposes of being multifunctional, double performance, and eco-friendliness.

The butterfly style burner assembly 30 may supply radiation heat for baking food, such as pizzas, placed on the above side thereof. Heated airflow moves upward through the through holes 22 such that the heated airflow, as being guided by the airflow passage 13, to circulate in a uniform manner so as to have top and bottom sides of the food sufficiently heated.

By arranging an upper chamber, which functions as an oven for baking, above the butterfly style burner assembly 30, the baking tray 21 may reach a temperature of 450° C. as receiving the thermal effect generated by the burning of the butterfly burner assembly 30, and if used simultaneously with the grill arranged under the butterfly burner assembly, the thermal energy can be even better used, so that the thermal energy utilization efficiency is made about twice of a conventional grill and the temperature of discharged waste gas can also be reduced thereby helping slow down the speed of global temperature rise.

Due to the arrangement of an oven above the butterfly style burner assembly 30, the temperature of the waste gas discharged can be reduced and the amount of enclosure material can be reduced to thereby help protect the environment.

In addition to cooking and baking carried out on the upper part, the grill grate 40 can be used to cook and grill food on the lower part, and as such, multiple functions are provided.

Referring to FIG. 3, in an example, the first cover 11 and the second cover 12 are each of a curved or arc configuration, so that the curves or arcs collectively define a curved upper chamber. In the embodiment, the first cover 11 and the second cover 12 are shaped to collectively define an upper chamber that is generally a hemispheric shape. The airflow passage 13 is arranged at a location close to or at a middle of the curved shape defined collectively by the first cover 11 and the second cover 12.

As such, by arranging the airflow passage 13 at a location close to or at the middle of the hemispheric shape defined by the first cover 11 and the second cover 12, in the upper chamber defined by the first cover 11 and the second cover 12, the heated airflow that passes through the through holes 22 can be guided uniformly through the airflow passage 13 to the outside so as to improve homogeneity of distributed of heated air inside the upper chamber.

Otherwise, if the airflow passage 13 is not arranged at a location close to the middle, the heated air inside the upper chamber would flow randomly and consequently heating would not be uniform.

Figure 4:
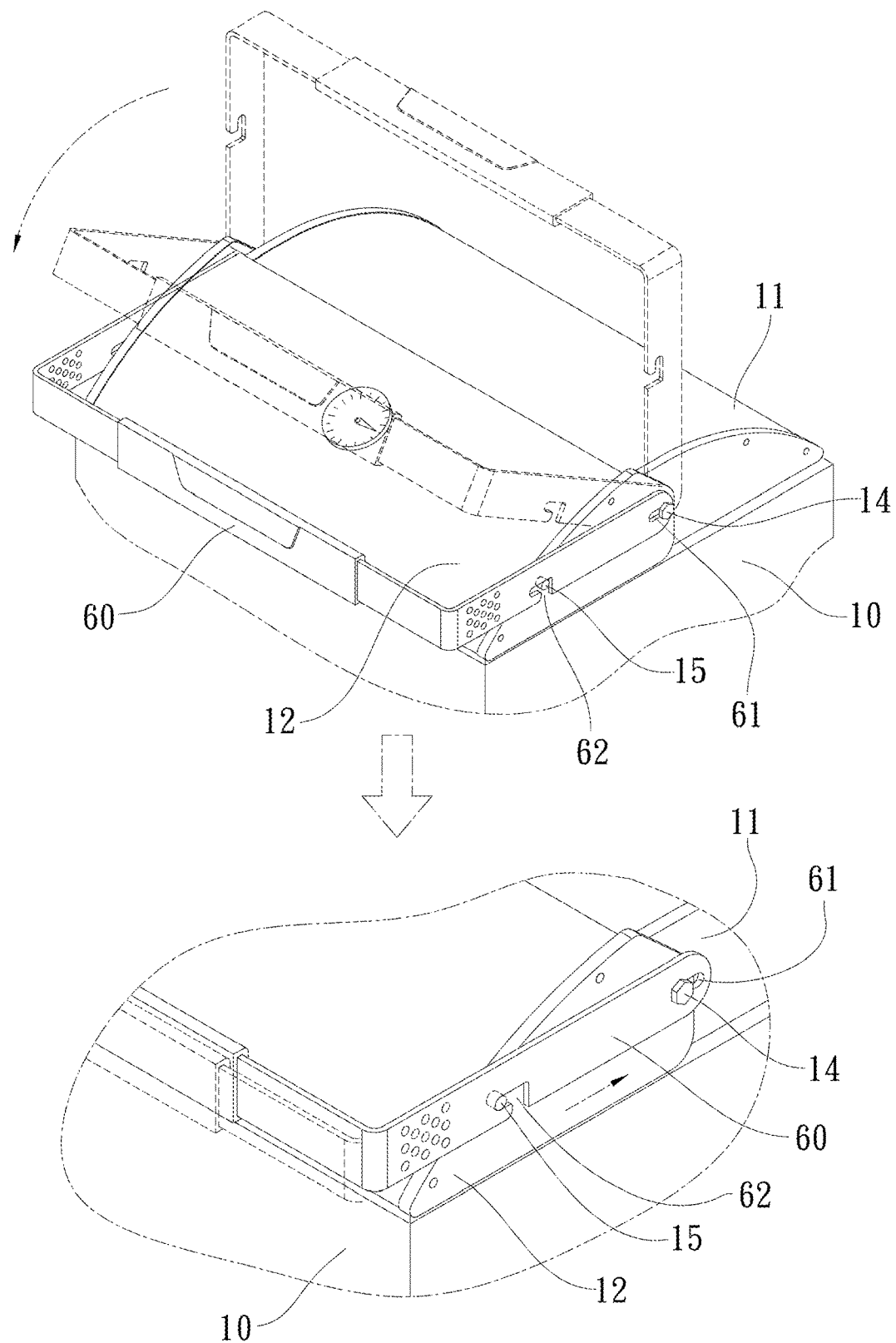
FIG. 4 is a perspective view showing an example of operation of a lift handle of the present invention.
Figure 5:
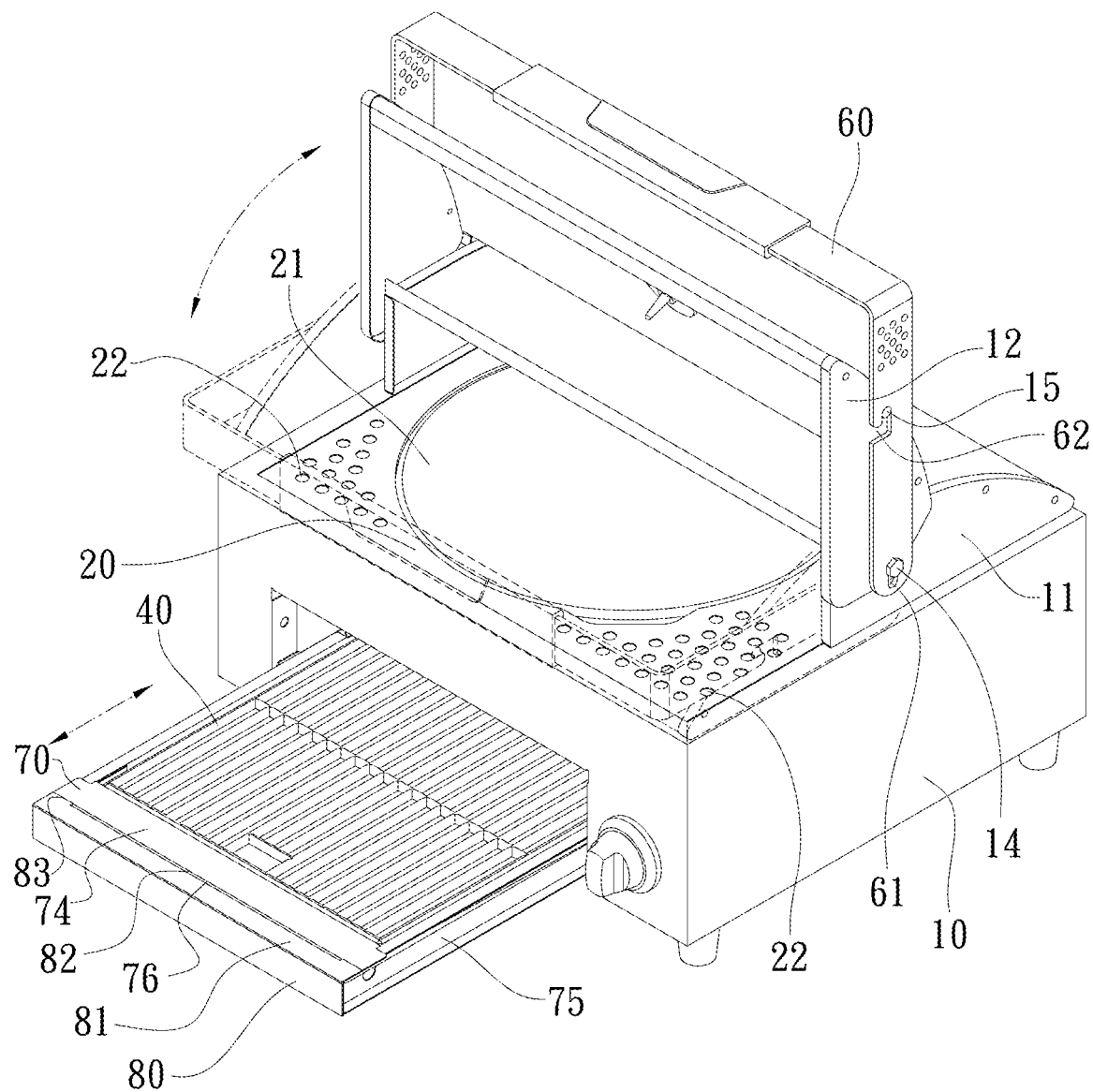
FIG. 5 is a perspective view showing an example of lifting/closing a second cover and entry and withdrawal of a grill grate and a grease guide tray according to the present invention.

Referring to FIGS. 4 and 5, in an example, the second cover 12 is rotatably mounted to the first cover 11 by means of two pivot pins 14 provided on two sides. Two ends of the lift handle 60 are coupled, by means of two sliding slots 61 respectively formed thereon, to the pivot pins 14, and the pivot pins 14 are respectively movable in the sliding slots 61, so that the lift handle 60 is movable with respect to and/or rotatable about support points defined by the pivot pins 14. The pivot pins 14 are each provided with an expanded end that is engageable with and thus retaining and stopping an outside surface of the lift handle 60 to prevent the sliding slots 61 from detaching from the pivot pins 14. Two side portions of the lift handle 60 are formed with two retention grooves 62, respectively, and the retention grooves 62 are each of an L-shape. The second cover 12 is provided with insertion pegs 15 respectively corresponding to the retention grooves 62 and the insertion pegs 15 are respectively insertable into and received in the retention groove 62 for being positioned therein or being selectively removable therefrom.

As such, with the arrangement of the retention grooves 62, after having been rotated downward, the lift handle 60 is movable in a front-rear direction to set the insertion pegs 15 in a retaining position relative thereto so as to retain and fix the lift handle 60 in such a position, and as such, the lift handle 60 is combined with and thus rotatable in unison with the second cover 12 about the same rotation axis, allowing the second cover 12 to be opened and/closed with the lift handle, which can also serve as a handgrip of the second cover 12 for protection against burning or hurting of a user's hand, for example due to high temperature.

When the insertion pegs 15 of the second cover 12 are movable out of and released from such a retaining position, the lift handle 60 can be rotated upward separately, so that the lift handle 60 is converted to provide a function as a hand grip for hand carrying.

Referring to FIGS. 1, 3, and 5, in an example, the main body 10 is provided, in an interior thereof, at a location below the burner assembly 30, with two slide rails 75. The two slide rails 75 have front ends that are fixed to a pull grip 80 on which the grease guide plate 70 is disposed, and the grill grate 40 is arranged on the grease guide plate 70. The pull grip 80 allows for pulling and/or pushing the grill grate 40 for movements of entry into and removal out of the main body 10. The grease guide plate 70 is provided with an inclined bottom surface 71 that inclines from a front section toward a rear end to reach an opening. The grease guide plate 70 is also provided with two inclined side surfaces 73 that incline downward from an upper edge and are connected to the inclined bottom surface 71. Grease generated by food being heated first drips onto the grease guide plate 71 and flow through the inclined side surfaces 73 and the inclined bottom surface 71 to automatically drain through the opening 72 and is eventually conducted into the grease pan 50 to have the grease spaced from a heat source thereby better preventing production of smoke. The pull grip 80 has a flat top section 81. The flat top section 81 has two ends each formed with projection 83. A recess 82 is formed between the two projections 83, wherein the projections 83 abuts against and supports an outer edge 76 of a front edge section 74 of the grease guide plate 70, so as to reduce the temperature transmitted to the pull grip 80, allowing the pull grip 80 to be directly operated by hands.

In an example, the grease pan 50 is disposed in the main body 10 in a movable manner for easy cleaning and dumping grease accumulated in the grease pan 50.

The examples and embodiments described above are provided for the purposes of illustration and explanation and are not intended to constrain the scope of the present invention. Variations and modifications that are readily appreciated from the appended claims are believed all belonging to the scope of the present invention.

I claim:

1. A compound eco-friendly stove, comprising:
a main body, which has a top opening that is provided with a first cover and a second cover, the first cover and the second cover being arranged to define an airflow passage therebetween;
a baking tray support, which is arranged in the top opening, the baking tray support receiving and supporting a baking tray thereon, portions of the baking tray support that are located at two sides of the baking tray being formed with multiple through holes;
a burner assembly, which is disposed in the main body at a location below the baking tray support;
a grill grate, which is disposed in the main body at a location below the burner assembly;
a grease pan, which is disposed in the main body at a location below the grill grate; and
a lift handle, which is mounted to the second cover, wherein a space above the burner assembly functions as an oven for baking food, while a space below the burner assembly is simultaneously used as a grill so as to achieve the purposes of being multifunctional, saving energy, and eco-friendliness.

2. The compound eco-friendly stove according to claim 1, wherein the first cover and the second cover are each of an arc configuration to define a curved upper chamber and the airflow passage is arranged at a location close to middle of a curve defined collectively by the first cover and the second cover.

3. The compound eco-friendly stove according to claim 1, wherein the second cover is rotatably mounted to the first cover by two pivot pins respectively provided at two sides and two ends of the lift handle are coupled to the pivot pins by two sliding slots, wherein the pivot pins are movable in the sliding slots so that the lift handle is movable with respect to and rotatable about support points defined by the pivot pins, the pivot pins having expanded ends to engage an outside surface of the lift handle to prevent the sliding slots from detaching from the pivot pins; and two sides of the lift handle are formed with two retention grooves, the retention grooves being of an L-shape, the second cover being formed with insertion pegs corresponding to the retention grooves, the insertion pegs being receivable into the retention grooves for positioning or removable therefrom.

4. The compound eco-friendly stove according to claim 1, wherein the grill grate is disposed on a grease guide plate and the grease guide plate has two sides that are provided with two slide rails for movably positioning in a side opening of the main body so that the grill grate is allowed to move in and out of the main body, the grease guide plate being used to conduct grease generated by food that is being heated into the grease pan.

5. The compound eco-friendly stove according to claim 4, wherein the grease guide plate has an inclined bottom surface, which inclines from a front section toward a rear end to reach an opening, and the grease guide plate further comprises two inclined side surfaces that incline downward from an upper edge and are connected to the inclined bottom surface.

6. The compound eco-friendly stove according to claim 4, wherein the two slide rails have front ends to which a pull grip is mounted for pushing and pulling the grill grate to move in and out of the main body.

7. The compound eco-friendly stove according to claim 6, wherein the grease guide plate has a front edge section and the pull grip has a flat top section, the flat top section being provided with projections to abut against and support the front edge section of the grease guide plate so as to reduce a temperature transmitted to the pull grip by the grease guide plate.

8. The compound eco-friendly stove according to claim 1, wherein the grease pan is arranged in the main body in a movable manner for easy cleaning and removal of grease accumulated in the grease pan.

\* \* \* \* \*